US010531517B2

(12) United States Patent
Huang et al.

(10) Patent No.: US 10,531,517 B2
(45) Date of Patent: Jan. 7, 2020

(54) CONNECTION METHOD FOR WIRELESS SYSTEM

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 77 days.

(21) Appl. No.: 15/880,134

(22) Filed: Jan. 25, 2018

(65) Prior Publication Data

US 2019/0098695 A1 Mar. 28, 2019

(30) Foreign Application Priority Data

Sep. 27, 2017 (TW) .............................. 106133187 A

(51) Int. Cl.
*H04W 88/04* (2009.01)
*H04W 76/18* (2018.01)
(Continued)

(52) U.S. Cl.
CPC .......... *H04W 88/04* (2013.01); *G06F 11/327* (2013.01); *H04W 76/18* (2018.02); *H04B 7/155* (2013.01); *H04W 4/30* (2018.02)

(58) Field of Classification Search
CPC ....... H04W 88/04; H04W 76/18; H04W 4/30; H04B 7/2606
See application file for complete search history.

(56) References Cited

U.S. PATENT DOCUMENTS 8,316,438 B1 * 11/2012 Bush .................. H04L 12/66
726/22
2008/0288591 A1 * 11/2008 Tanimoto ............ H04L 12/4604
709/205
(Continued)

FOREIGN PATENT DOCUMENTS

CN 102077533 B 2/2015
EP 2731304 A1 5/2014
(Continued)

OTHER PUBLICATIONS

Examination Report for TW106133187, dated Jun. 20, 2018, Total of 5 pages.
(Continued)

*Primary Examiner* — Charles C Jiang
*Assistant Examiner* — Ryan C Kavleski
(74) *Attorney, Agent, or Firm* — R. Lynette Wylie; Apex Juris, pllc.

(57) ABSTRACT

A connection method for a wireless system, wherein the wireless system includes an access point, an electronic device, a relay device and an appliance; the electronic device and the relay device are connected to the access point, respectively; the relay device is connected to the appliance via signals; the relay device is adapted to send control commands to the appliance. The connection method includes the following steps: connecting the relay device to a server through the access point; sending an IP address of the relay device assigned by the access point to the server; sending an inquiry command from the electronic device to the server; sending a connection request command to the received IP address; establishing a connection between the electronic device and the relay device when a connection-successful information is received. Thus, the risk that the (Continued)

electronic device connection could be disconnected is reduced.

11 Claims, 4 Drawing Sheets

(51) Int. Cl.
*G06F 11/32* (2006.01)
*H04B 7/155* (2006.01)
*H04W 4/30* (2018.01)

(56) References Cited

U.S. PATENT DOCUMENTS

| | | | | |
|---|---|---|---|---|
| 2011/0002261 | A1* | 1/2011 | Mocanu | H04W 8/26 370/328 |
| 2014/0244001 | A1* | 8/2014 | Glickfield | H04L 67/16 700/33 |
| 2015/0172846 | A1* | 6/2015 | Ge | H04W 8/005 370/254 |
| 2016/0191270 | A1* | 6/2016 | Huang | H04L 12/2816 709/227 |
| 2016/0295616 | A1* | 10/2016 | Zakaria | H04W 76/14 |
| 2017/0164414 | A1 | 6/2017 | Cho et al. | |

FOREIGN PATENT DOCUMENTS

| | | |
|---|---|---|
| TW | 201417540 A | 5/2014 |
| TW | I520638 B | 2/2016 |

OTHER PUBLICATIONS

Search Report for TW106133187, dated Jun. 20, 2018, Total of 1 page.
English Abstract for CN102077533, Total of 1 page.
English Abstract for TW201417540, Total of 1 page.
English Abstract for TWI520638, Total of 1 page.
Examination Report for TW106133187, dated Apr. 26, 2019, Total of 4 pages.
Search Report for TW108133187, dated Apr. 26, 2019, Total of 1 page.

* cited by examiner

CONNECTION METHOD FOR WIRELESS SYSTEM

BACKGROUND OF THE INVENTION

1. Technical Field

The present invention is related to a wireless system, and more particularly related to a connection method for a wireless system.

2. Description of Related Art

A remote control is a commonly seen component in present days to operate a home appliance wirelessly from a short distance. Typically, one remote control is matched with one home appliance in a one-to-one relation, which means that each home appliance has a specific remote control to control it. Therefore, with more home appliances in a home, there would be more remote controls to be placed. Furthermore, home appliances of the same type usually have similar looking remote controls, which may confuse the user.

In light of this, a remote control system having a relay device is developed. The relay device could be connected to an access point, which allows the user to access the relay device with an electronic device such as a computer or a mobile phone through the access point. Within such a remote control system, the user could input a command on an electronic device, and this command would be then transmitted to the relay device. Upon receiving the command, the relay device would convert it into a control signal, and transmit the control signal to a specific home appliance. In this way, the user is able to control various home appliances with one single electronic device as a remote control.

When the relay device is connected to the access point, the access point would assign an IP address to the relay device. After being set up, the electronic device is communicated with the relay device via the IP address so as to send control commands to the relay device. However, when a connection between the relay device and the access point is interrupted and then be established again, the IP address received from the access point may be different. Therefore, the electronic device would be unable to be connected to the relay device via the IP address set up originally, thereby losing communication with the relay device.

BRIEF SUMMARY OF THE INVENTION

In view of the above, the present invention is to provide a connection method for a wireless system which could reduce the possibility that the electronic device could not be connected to the relay device.

To achieve the object mentioned above, the present invention provides a connection method for a wireless system, wherein the wireless system includes an access point, an electronic device, a relay device and at least one appliance; the electronic device and the relay device are connected to the access point, respectively; the relay device is connected to the appliance via signals; the relay device is adapted to send control commands to the appliance; the connection method for the wireless system comprises the following steps: A. connecting the relay device to a server through the access point; B. sending an IP address of the relay device which is assigned by the access point to the server and storing the IP address in the server; C. connecting the electronic device to the server, and sending an inquiry command from the electronic device to the server to inquiry the IP address of the relay device; D. sending the stored IP address of the relay device back to the electronic device from the server; E. receiving the IP address of the relay device from the server by the electronic device, and sending a connection request command to the received IP address from the electronic device through the access point for at least one time; F. establishing a connection between the electronic device and the relay device when a connection-successful information is received by the electronic device.

The advantage of the present invention is that through uploading the IP address by the relay device to the server, for the electronic device to obtain the IP address, even though the electronic device does not recognize the IP address of the relay device before the connection with the relay device, the electronic device could still obtain the IP address of the relay device from the server, thereby reducing the possibility that the electronic device could not be connected to the relay device.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
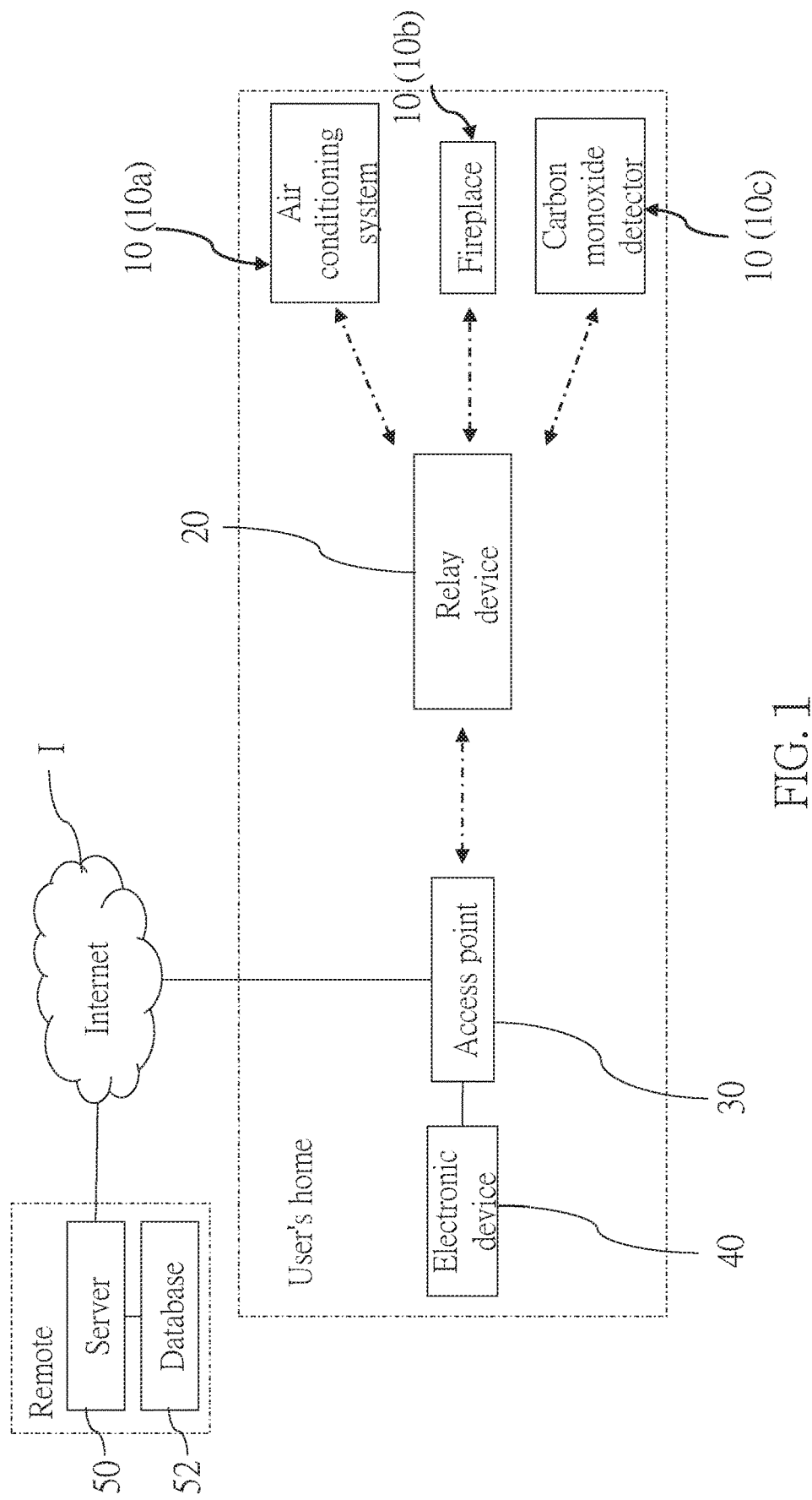
FIG. 1 is a schematic block diagram of a wireless system of a first embodiment according to the present invention.

The following illustrative embodiments and drawings are provided to illustrate the disclosure of the present invention, these and other advantages and effects can be clearly understood by persons skilled in the art after reading the disclosure of this specification. As shown in FIG. 1, a wireless system of a first embodiment according to the present invention includes at least one appliance 10, a relay device 20, an access point 30, an electronic device 40 and a server 50.

In this embodiment, the wireless system includes a plurality of appliances 10 which are located at a user's home, wherein the appliances 10 include two controllable appliances and one detection appliance. In this embodiment, the controllable appliances are an air conditioning system 10a and a fireplace 10b as an example, and the detection appliance is a carbon monoxide detector 10c as an example. Each of the appliances 10 is wirelessly connected to the relay device 20 via a radio frequency signal (i.e., RF signal). However, the wireless connection with RF signals is not a limitation of the present invention. Other wireless signals such as Wi-Fi, Zigbee, Bluetooth, infrared ray, etc., also could be utilized. The controllable appliances are configured to receive a control command and perform an action corresponding to the control command (e.g., power on/off, adjusting temperature, etc.). A state information of each of the controllable appliances is compiled into an RF signal to be transmitted, wherein the state information may include a status of being on/off, a current temperature, an error code, etc. Also, a state information of the detection appliance is compiled into an RF signal to be transmitted, wherein the state information may include a physical quantity measured by the detection appliance (e.g., concentration of carbon monoxide).

The relay device 20 is located at the user's home and is wirelessly connected to the access point 30 via a Wi-Fi signal so as to be connected to a local area network of the user's home, and could be further connected to an internet I via the access point 30. The relay device 20 is adapted to receive an RF/Wi-Fi signal, and convert the received RF/Wi-Fi signal into a corresponding Wi-Fi/RF signal to be sent out. Also, the relay device 20 is adapted to receive the RF signal including the state information from the appliances 10, and to interpret the received RF signal to obtain the corresponding state information, and the corresponding state information is stored into a memory (not shown). When the relay device 20 is connected to the access point 30, the access point 30 would assign an IP address to the relay device 20.

In this embodiment, the electronic device 40 is a tablet as an example, which could be connected to the access point 30. The electronic device 40 has a built-in application, which is adapted for the user to input control commands (e.g., power on/off, adjusting temperature, etc.) of the appliances 10. The user could utilize the application of the electronic device 40 to designate at least one of the appliances 10 which is to be controlled. When the electronic device 40 is connected to the Internet I directly, one or a plurality of control commands inputted by the user could be sent to the server 50 by the electronic device 40 through the Internet I and then be transmitted to the relay device 20, wherein said one or plurality of control commands include an IP address and an identification code of the relay device 20, a device code corresponding to the at least one appliance 10, and command codes (e.g., the corresponding command codes for powering on or off, adjusting temperature, and other operations), whereby to designate the relay device 20 or the appliance 10 which is to be controlled.

The server 50 is located at a remote terminal as an example, and is connected to a database 52 and the Internet I. The server 50 and the database 52 could execute at the same server host or execute respectively at two server hosts. In other applications, the server 50 and the database 52 could also be located at the user's home and connected to a local area network through the access point 30.

Figure 2:
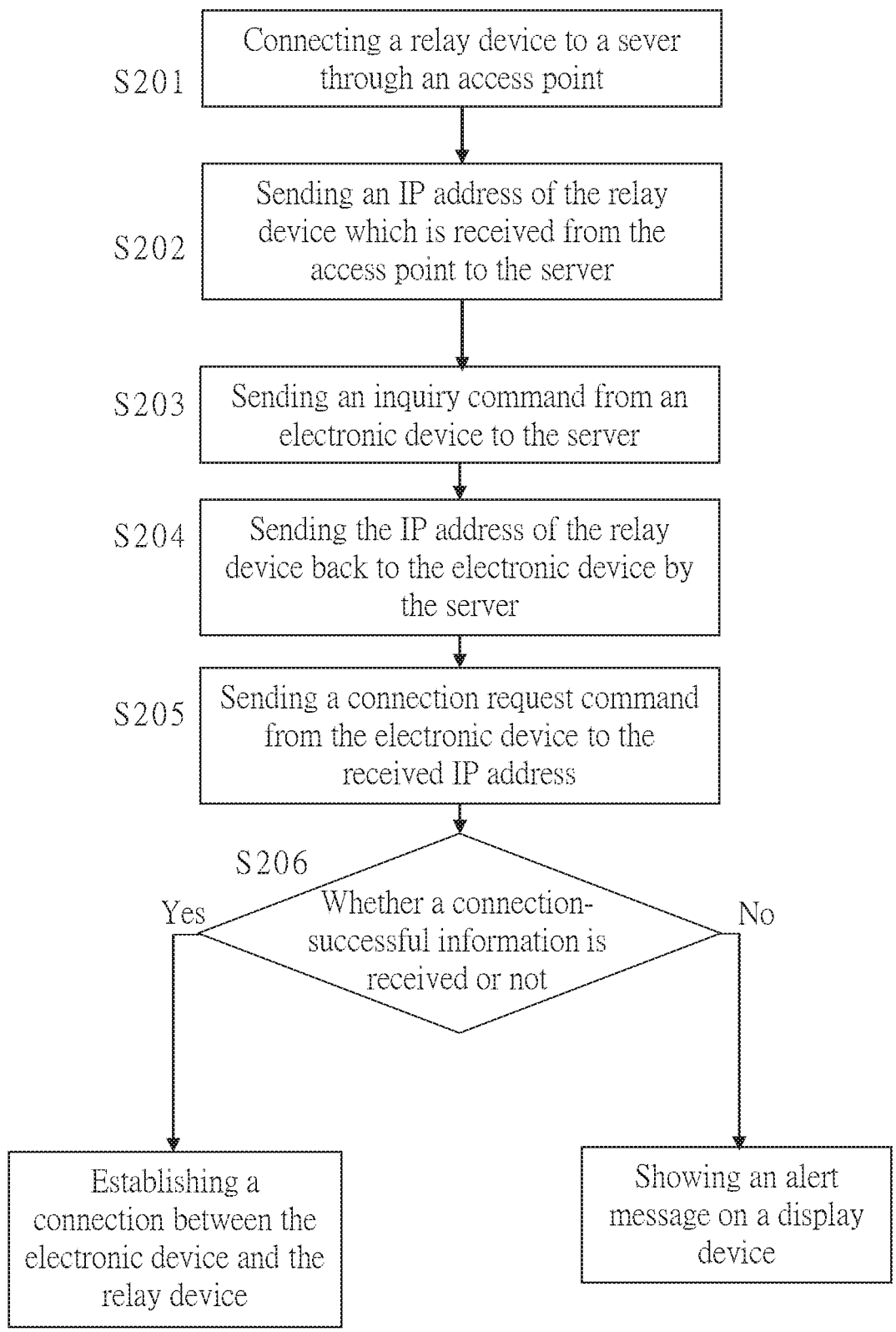
FIG. 2 is a flowchart of a connection method for the wireless system of the first embodiment according to the present invention.

With the aforementioned configuration, the connection method for the wireless system of the first embodiment of the present invention could be applied, wherein the method includes the following steps, as shown in FIG. 2.

In step S201, the access point 30 is connected to the Internet I, and the relay device 20 is connected to the server 50 through the access point 30. In this embodiment, the user could utilize the electronic device 40 to connect to the server 50, and establish an account in the server 50, and record the information of the account in the electronic device 40 in the meanwhile.

In step S202, an IP address of the relay device 20 which is assigned by the access point 30 is sent to the server 50, and then the IP address would be stored into the database 52 by the server 50. In this embodiment, the server 50 establishes a corresponding relationship between the information of the account and the IP address of the relay device 20, and the corresponding relationship is stored into the database 52.

In step S203, the user controls the application of the electronic device 40 to connect to the server 50 and send an inquiry command to the server 50 so as to inquiry the IP address of the relay device 20. In this embodiment, the electronic device 40 sends the information of the account together with the inquiry command to the server 50.

In step S204, when the server 50 receives the inquiry command, the server 50 would send the IP address of the relay device 20 which is stored in the database 52 back to the electronic device 40. In this embodiment, the server 50 searches the IP address of the relay device 20 which is corresponding to the account according to the information of the account so as to send the IP address of the relay device 20 back to the electronic device 40.

In step S205, after receiving the IP address of the relay device 20 from the server 50, the electronic device 40 would send a connection request command to the received IP address through the access point 30 for at least one time.

In step S206, the electronic device 40 would determine whether a connection-successful information is received from the aforementioned IP address or not.

If the electronic device 40 does not receive the connection-successful information after a period of time, the application would show an alert message on a display device of the electronic device 40 to alert that the relay device 20 is not connected to the electronic device 40.

When the electronic device 40 receives the connection-successful information from the aforementioned IP address, it means that the relay device 20 has confirmed the reception of the connection request command, and the connection between the electronic device 40 and the relay device 20 has been established. Whereby, the electronic device 40 could send the control command to the relay device 20, and the relay device 20 could also send the state information back to the electronic device 40.

According to the illustration mentioned above, since the IP address of the relay device 20 is uploaded to the server 50 by the relay device 20 itself, the electronic device 40 could obtain the IP address of the relay device 20 from the server 50, even though the electronic device 40 does not recognize the IP address of the relay device 20 before connection, whereby improving the convenience of the connection.

In addition to the steps included in the first embodiment, a connection method for a wireless system of a second embodiment according to the present invention further includes the following steps. When the relay device 20 is connected to the access point 30 each time, the relay device 20 would record an assigned IP address respectively. When a connection between the relay device 20 and the access point 30 is interrupted and then be established again, the relay device 20 would record a newly assigned IP address again. If the newly assigned IP address is different from the IP address which is assigned last time, the relay device 20 would be connected to a server 50 through the access point 30 again and send the newly assigned IP address to the server 50 so as to store the newly assigned IP address into the database 52. Whereby, when the electronic device 40 could not be connected to the relay device 20 via the IP address received from the server 50, the electronic device 40 would send the inquiry command to the server 50 again and request the server 50 to send the newly assigned IP address of the relay device 20 back to the electronic device 40 for connection.

Figure 3:
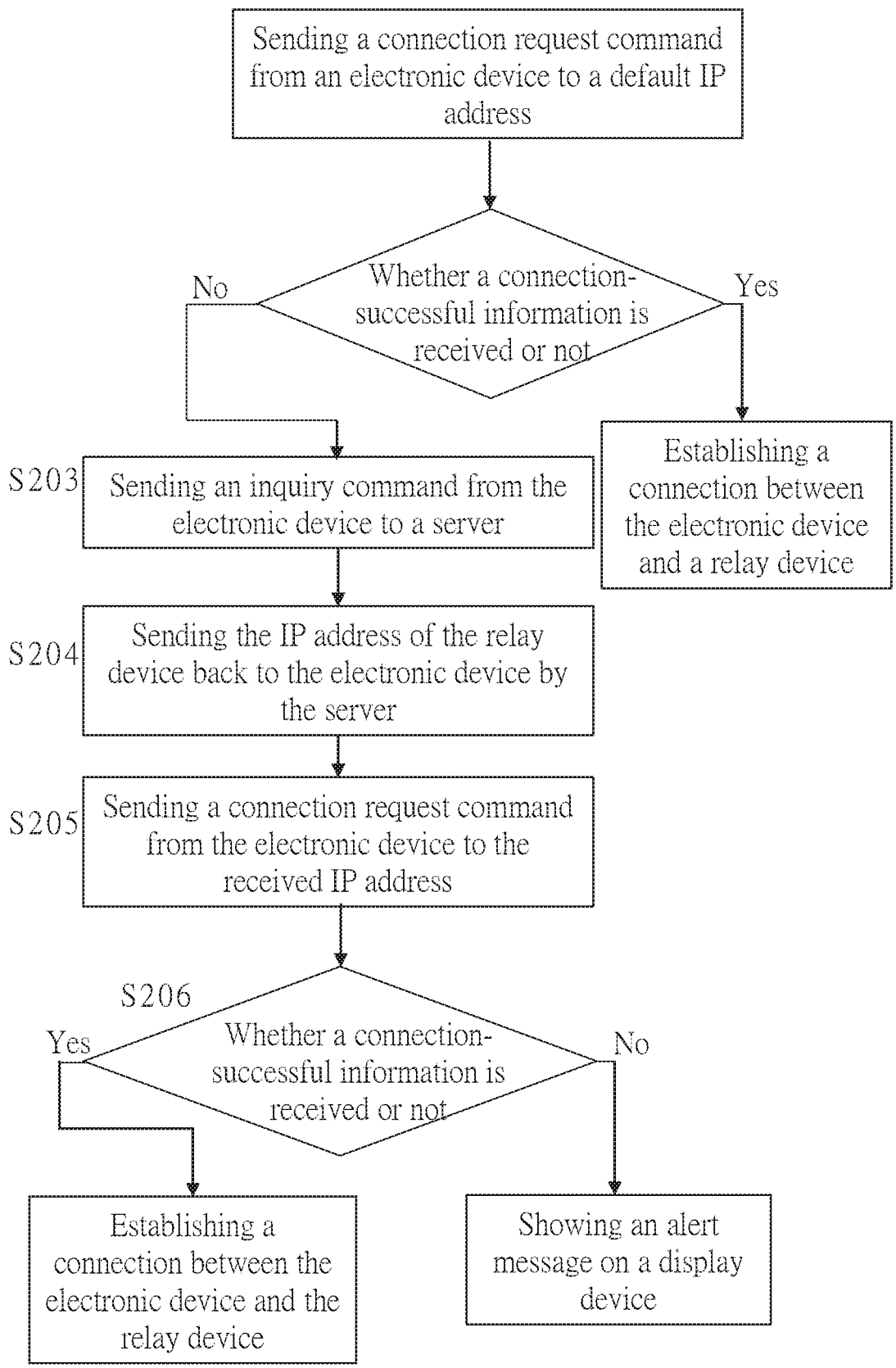
FIG. 3 is a partial flowchart of a connection method for the wireless system of a third embodiment according to the present invention.

As shown in FIG. 3, a connection method for a wireless system of a third embodiment according to the present invention is based on the method of the first embodiment but further includes the following steps.

A default IP address is recorded in the electronic device 40 which could be adapted to be connected to the relay device 20. The default IP address could be the IP address of the relay device 20 which is used in a previous connection or a fixed IP address.

Before step S203, the method of the third embodiment further includes the following steps in addition to steps S201 and S202 (not shown in FIG. 3), wherein the following steps and steps S201, S202 could be executed in an alternative sequence.

First, the electronic device 40 sends the connection request command to the default IP address through the access point 30 for at least one time.

Then, the electronic device 40 would determine whether the connection-successful information is received from the default IP address or not.

When the electronic device 40 receives the connection-successful information from the default IP address, the connection between the electronic device 40 and the relay device 20 is established.

If the electronic device 40 does not receive the connection-successful information after a period of time, then steps S203 to S206 would be executed.

Figure 4:
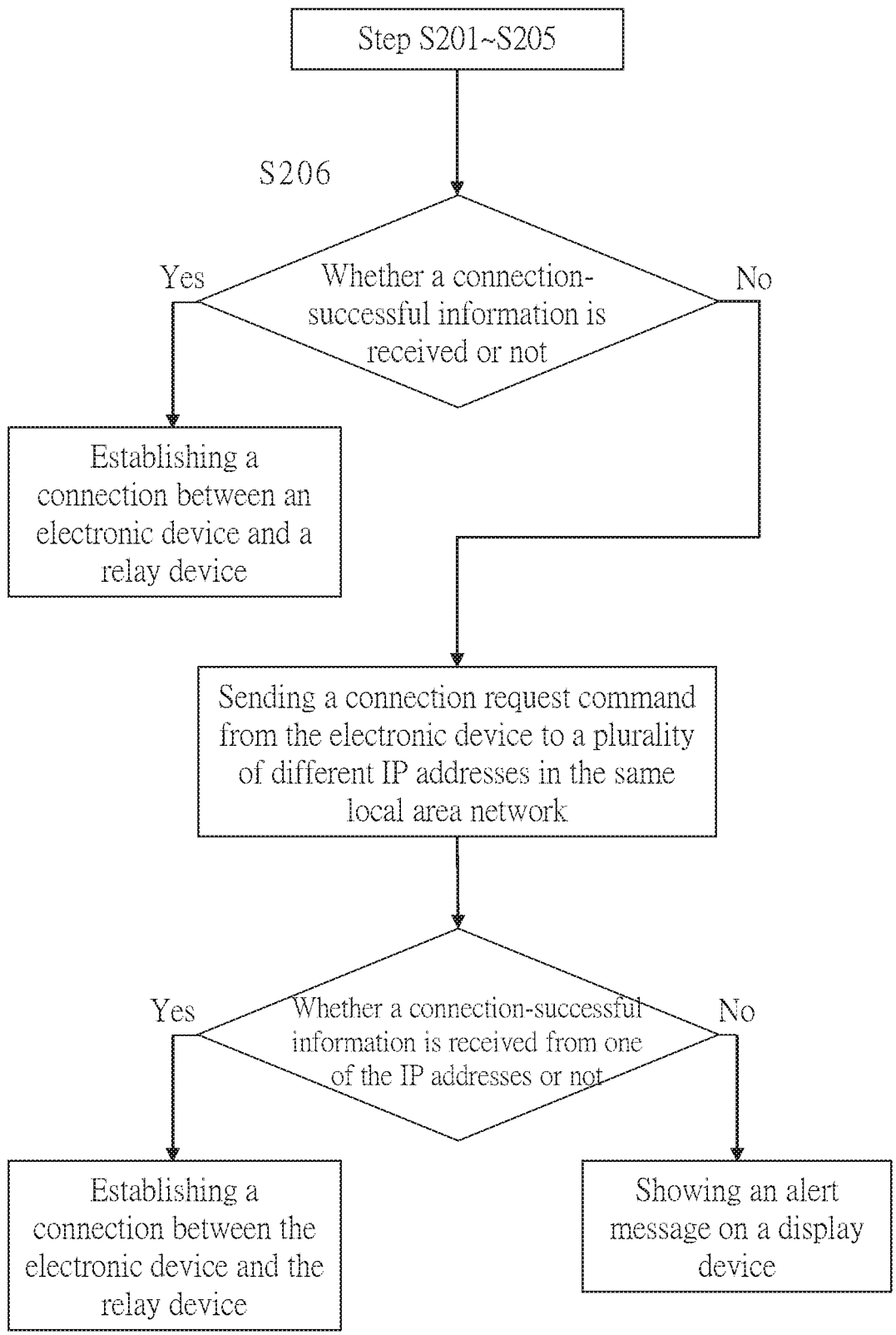
FIG. 4 is a partial flowchart of a connection method for the wireless system of a fourth embodiment according to the present invention.

As shown in FIG. 4, a connection method for a wireless system of a fourth embodiment according to the present invention is based on the method of the first embodiment and step S206 further includes the following steps.

If the connection-successful information is not received, the electronic device 40 would send a plurality of connection request commands to a plurality of different IP addresses in the same local area network through the access point 30.

Then, the electronic device 40 would determine whether the connection-successful information is received from any one of the plurality of IP addresses or not.

When the connection-successful information is received from any one of the plurality of IP addresses, the connection between the electronic device 40 and the relay device 20 is established.

If the connection-successful information is not received, the application would show an alert message on a display device of the electronic device 40 to alert that the relay device 20 is not connected to the electronic device 40.

In this embodiment, the electronic device 40 sends the connection request commands to the IP addresses in the same local area network according to a default order through the access point 30, respectively. The IP address of the relay device 20 and the IP addresses in the same local area network apply an IPv4 protocol which consists of four octets (e.g., 192.168.0.X, wherein X is an integer between 0 and 255), wherein first three octets of the IP addresses and first three octets of the IP address of the relay device 20 sent back from the server 50 are the same, while the last octets of the IP addresses and the IP address of the relay device 20 are different. Therefore, the electronic device 40 sends the connection request commands to the IP addresses whose last octet is between 0 and 255 so as to determine whether a connection-successful information is received from any one of the IP addresses or not. When the connection-successful information is received from any one of the IP addresses, the electronic device 40 would stop sending the connection request commands which are not sent yet.

The aforementioned default order could be an increment number starting from 0 or a decrement number starting from 255. In this embodiment, the default order increments or decrements based on the last octet of the IP address of the relay device 20 sent back from the server 50 so as to increase the scanning speed of the IP addresses. For example, when the IP address of the relay device 20 sent back from the server 50 includes the last octet of N, the electronic device 40 would send the connection request commands to the IP addresses whose last octet is between N−p and N+q, wherein p is an integer between 1 and 20, and q is an integer between 1 and 20. The sending order for the IP addresses could increment from the last octet of N−p to the last octet of N+q or decrement from the last octet of N+q to the last octet of N−p, alternatively. If the connection-successful information is not received from the IP addresses whose last octet is between N−p and N+q, the electronic device 40 would continue to send the connection request commands to other IP addresses.

In addition to the aforementioned method for scanning IP addresses, a method of an alternative embodiment, which is based on the method of the first embodiment, could further include a step of storing a default IP address in the electronic device 40 in step S201, wherein the default IP address is adapted for connecting to the relay device 20. The relay device 20 could send the default IP address or an IP address other than the default IP address to the access point 30, wherein a difference between the IP address and the default IP address is at least equal to or multiple times of an integer, and request the access point 30 to assign the sent IP address to the relay device 20. For example, when the default IP address is 192.168.0.100, and the integer is 5, the access point 30 would connect to the relay device 20 via the default IP address first. If the default IP address is occupied by other devices, the relay device 20 would continue to send an IP address which has a difference of at least equal to the integer (e.g., 192.168.0.105) to the access point 30. If the IP address is still occupied by other devices, the relay device 20 would send the IP address again which has a difference of double of the integer (192.168.0.110), and so on. In step S206, if the connection-successful information is not received, the electronic device 40 would send at least one connection request command to at least one different IP address in the same local area network through the access point 30, wherein a difference between the at least one IP address and the default IP address is at least equal to or multiple times of the integer (e.g., the at least one IP address is 192.168.0.105, 192.168.0.110, 192.168.0.115, and so on). When the connection-successful information is received from the at least one IP address, the connection between the electronic device 40 and the relay device 20 is established.

According to the illustration mentioned above, the connection method for the wireless system of the present invention, through uploading the IP address by the relay device 20 to the server 50, for the electronic device 40 to obtain the IP address, even though the electronic device 40 does not recognize the IP address of the relay device 20 before the connection with the relay device 20, the electronic device 40 could still obtain the IP address of the relay device 20 from the server 50, thereby reducing the possibility that the electronic device 40 could not be connected to the relay device 20.

It must be pointed out that the embodiments described above are only some embodiments of the present invention. All equivalent structures which employ the concepts disclosed in this specification and the appended claims should fall within the scope of the present invention.

What is claimed is:

1. A connection method for a wireless system, wherein the wireless system includes and access point, an electronic device, a relay device and at least one appliance; the electronic device and the relay device are connected to the access point, respectively; the relay device is connected to the appliance via signals; the relay device is adapted to send control commands to the appliance; the connection method for the wireless system comprises the following steps:
  A. connecting the relay device to a server through the access point and establishing an account in the server and recording information of the account in the electronic device;
  B. sending an IP address of the relay device which is assigned by the access point to the server and storing the IP address in the server and establishing a corresponding relationship between the account and the IP address of the relay device;
  C. connecting the electronic device to the server, sending the information of the account and sending an inquiry command from the electronic device to the server to inquiry the IP address of the relay device;
  D. searching the IP address of the relay device corresponding to the account according to the information of the account and sending the stored IP address of the relay device back to the electronic device from the server;
  E. receiving the IP address of the relay device from the server by the electronic device, and sending a connection request command to the received IP address from the electronic device through the access point for at least one time; and
  F. establishing a connection between the electronic device and the relay device when a connection-successful information is received by the electronic device.

2. The connection method of claim 1, wherein step F further comprises:
  showing an alert message on a display device of the electronic device to alert that the relay device is not connected to the electronic device when the connection-successful information is not received.

3. The connection method of claim 1, wherein step F further comprises:
  sending a plurality of connection request commands from the electronic device to a plurality of different IP addresses in the same local area network through the access point when the connection-successful information is not received; and
  establishing the connection between the electronic device and the relay device when the connection-successful information is received from any one of the plurality of IP addresses.

4. The connection method of claim 3, wherein step F further comprises sending the connection request commands to the plurality of IP addresses in the same local area network from the electronic device according to a default order through the access point respectively when the connection-successful information is not received.

5. The connection method of claim 4, wherein the IP address of the relay device consists of four octets; in step F, the plurality of IP addresses where the electronic device sends the connection request commands to consist of four octets respectively, wherein first three octets of the IP addresses and first three octets of the IP address of the relay device sent back from the server are the same, while the last octets of the IP addresses and the IP address of the relay device are between 0 and 255.

6. The connection method of claim 5, wherein the method further comprises: in step D, the IP address of the relay device sent back from the server 50 includes last one of the four octets of N; in step F, the connection request commands are sent to the IP addresses whose last octet is between N−p and N+q first, wherein p is an integer between 1 and 20, and q is an integer between 1 and 20; if the connection-successful information is not received from the IP addresses whose last octet is between N−p and N+q, the connection request commands are continued to be sent to other IP addresses.

7. The connection method of claim 1, wherein the method further comprises recording the IP address assigned by the access point in the relay device in step A, and after step F, recording a newly assigned IP address by the relay device when a connection between the relay device and the access point is interrupted and then be established again, and connecting the relay device to the server through the access point and sending the newly assigned IP address to the server and storing in the server if the newly assigned IP address is different from the IP address which is assigned in step A.

8. The connection method of claim 1, wherein step A further comprises storing a default IP address in the relay device, and sending the default IP address or an IP address other than the default IP address to the access point, wherein a difference between the IP address and the default IP address is at least equal to or multiple times of an integer and requesting the access point to assign the sent IP address to the relay device; step F further comprises sending at least one connection request command to at least one different IP address in the same local area network from the electronic device through the access point if the connection-successful information is not received, wherein a difference between the at least one IP address and the default IP address is at least equal to or multiple times of the integer; establishing the connection between the electronic device and the relay device when the connection-successful information is received from the at least one IP address.

9. The connection method of claim 1, wherein the method further comprises the following steps before step C: sending a connection request command to a default IP address from the electronic device through the access point for at least one time.

10. A connection method for a wireless system, wherein the wireless system includes an access point, an electronic device, a relay device and at least one appliance; the electronic device and the relay device are connected to the access point, respectively; the relay device is connected to the appliance via signals; the relay device is adapted to send control commands to the appliance; the connection method for the wireless system comprises the following steps:
  A. connecting the relay device to a server through the access point;
  B. sending an IP address of the relay device which is assigned by the access point to the server and storing the IP address in the server;
  C. connecting the electronic device to the server, and sending an inquiry command from the electronic device to the server to inquiry the IP address of the relay device;
  D. sending the stored IP address of the relay device back to the electronic device from the server;
  E. receiving the IP address of the relay device from the server by the electronic device, and sending a connection request command to the received IP address from the electronic device through the access point for at least one time; and
  F. sending a plurality of connection request commands from the electronic device to a plurality of different IP addresses in the same local area network through the access point when the connection-successful information is not received, thereby establishing a connection between the electronic device and the relay device when a connection-successful information is received by the electronic device from any one of the plurality of IP addresses.

11. A connection method for a wireless system, wherein the wireless system includes an access point, an electronic device, a relay device and at least one appliance; the electronic device and the relay device are connected to the access point, respectively; the relay device is connected to the appliance via signals; the relay device is adapted to send control commands to the appliance; the connection method for the wireless system comprises the following steps:

A. connecting the relay device to a server through the access point and storing a default IP address in the relay device, and sending the default IP address or an IP address other than the default IP address to the access point, wherein a difference between the IP address and the default IP address is at least equal to or multiple times of an integer and requesting the access point to assign the sent IP address to the relay device;

B. sending an IP address of the relay device which is assigned by the access point to the server and storing the IP address in the server;

C. connecting the electronic device to the server, and sending an inquiry command from the electronic device to the server to inquiry the IP address of the relay device;

D. sending the stored IP address of the relay device back to the electronic device from the server;

E. receiving the IP address of the relay device from the server by the electronic device, and sending a connection request command to the received IP address from the electronic device through the access point for at least one time; and F. sending at least one connection request command to at least one different IP address in the same local area network from the electronic device through the access point if the connection-successful information is not received, wherein a difference between the at least one IP address and the default IP address is at least equal to or multiple times of the integer thereby establishing a connection between the electronic device and the relay device when a connection-successful information is received by the electronic device from the at least one IP address.

\* \* \* \* \*